Aug. 25, 1959 D. D. WILLARD 2,901,738
DIFFERENTIAL INTERLOCK FOR SERVO SYSTEM
Filed Dec. 13, 1956
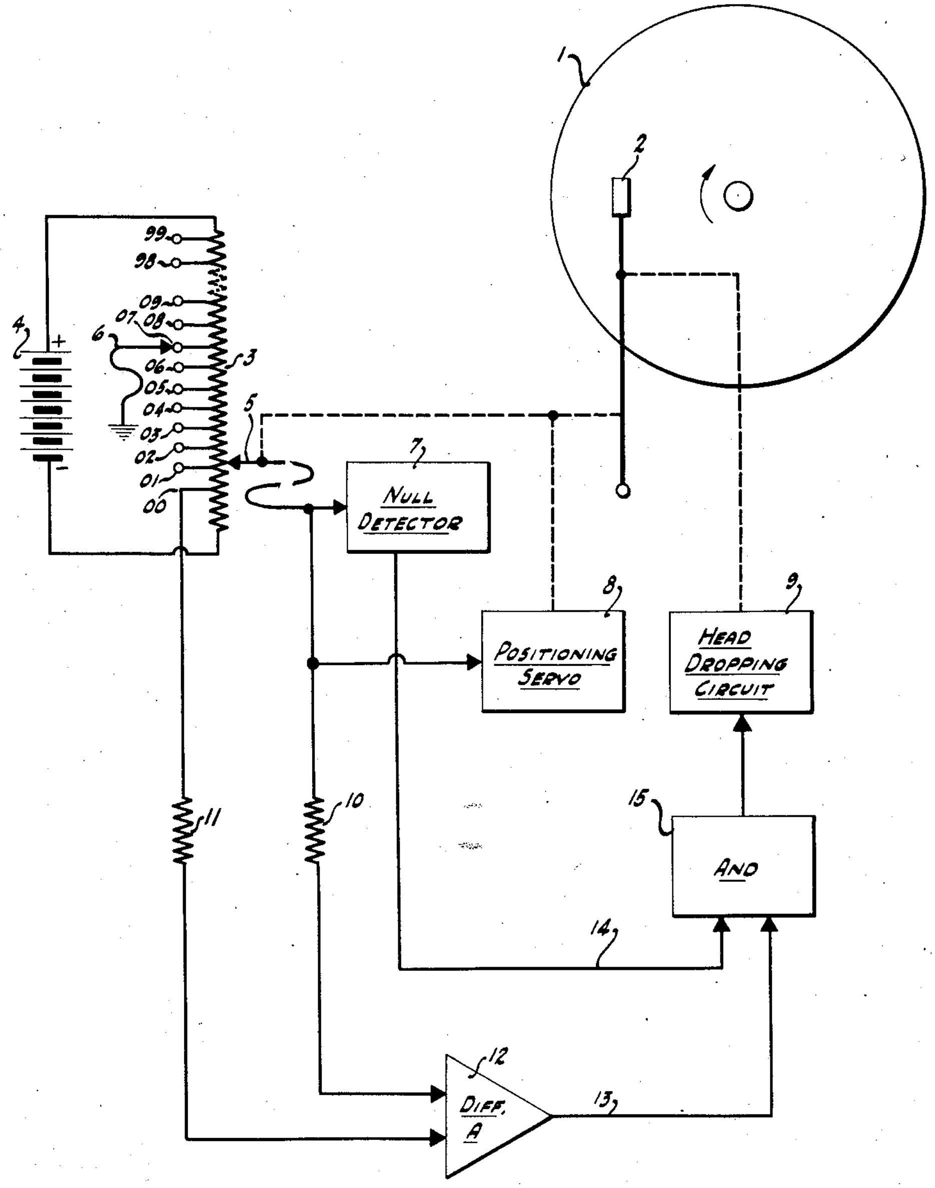
INVENTOR.
DENNIS D. WILLARD
BY Lippincott & Smith
ATTORNEYS United States Patent Office 2,901,738

Patented Aug. 25, 1959

2,901,738

DIFFERENTIAL INTERLOCK FOR SERVO SYSTEM

Dennis D. Willard, San Jose, Calif., assignor to International Business Machines Corporation, New York, N.Y., a corporation of New York Application December 13, 1956, Serial No. 628,041

3 Claims. (Cl. 340—174)

This invention relates to improvements in a servo system for positioning a magnetic recording and reproducing transducer head upon a selected recording track on the surface of a rotating disc in a random-access magnetic-memory unit for computers.

A random-access magnetic-memory apparatus for computers has heretofore been devised. Data that must be "remembered" by the computer is magnetically recorded on the surfaces of rotating discs. Each disc has approximately one hundred concentric circular recording tracks in which data can be recorded. A considerable number of discs are arranged in a stack, slightly separated from one another, somewhat like the stack of phonograph records in an automatic record player. To record information on or to reproduce information from any selected recording track of a selected disc, a magnetic recording and reproducing transducer head must be moved into position on and in alinement with the selected recording track. After, but not until, the head is alined with the selected track, the head is dropped into closely spaced relation to the disc and then is held just out of contact with the disc surface by a stream of air released through orifices in the head. During movement of the head, and in particular when the head is being moved from a "home" position outside of the disc periphery onto the disc, the head must be raised substantially above the disc surface to prevent contact between the head and the disc that might damage either or both.

A servo system for accomplishing the above-described positioning of the head has previously been developed and is already known to those skilled in the art. Under normal conditions this prior servo system operates quite satisfactorily. However, component failures sometimes cause malfunctioning of the servo system such that the head is dropped or lowered between the "home" position and the edge of the rotating disc, whereupon the head comes into contact with the edge of the rotating disc and either or both may be damaged. The object of the present invention is to improve the aforesaid servo system by providing an interlock that will prevent such malfunctioning. Evidently the interlock must contain no components that are in themselves likely to fail, and this excludes such obvious possibilities as the placing of a switch beneath the head to prevent its being lowered until it has passed over the edge of the rotating disc.

Briefly stated, the prior servo system includes a potentiometer having a movable tap or wiper that is moved along the potentiometer in synchronism with movements of the head relative to the rotating disc. A number of fixed taps along the length of the potentiometer correspond to the positions of the wiper when the transducer head is positioned over respective ones of the recording tracks on the surface of the disc. Whenever the transducer head is between the "home" position and the outermost recording track on the disc the electric potential at the wiper has a predetermined polarity with respect to the electric potential at the fixed tap corresponding to the outermost track.

In accordance with this invention the potential at the wiper and the potential at the aforesaid fixed tap are compared by a differential amplifier, and the difference signal is supplied to an "and" or coincidence circuit along with the output signal from a null detector connected to the wiper. Only when both signals have chosen values, there is a signal transmitted from the "and" circuit to the circuit that drops the head into closely-spaced relation with the disc. By this means inadvertent dropping of the head between the "null" position and the outermost recording track is prevented. Consequently, damage to the recording head and disc due to premature dropping of the head is eliminated.

The invention will be better understood from the following detailed description taken in connection with the accompanying drawing, and its scope is pointed out in the appended claims. In the drawing:

The single figure is a schematic diagram illustrating apparatus embodying the present invention.

Referring now to the drawing, a magnetic recording surface is formed upon the surface of a rotating disc 1. The disc is of an appropriate diameter to provide a plurality of concentric circular recording tracks on its surface. For example, there may be one hundred concentric circular recording tracks on the surface of disc 1. A plurality of similar discs can be arranged in a stack, with the discs parallel and slightly spaced from one another, to provide a magnetic memory of large capacity for use in a computer. To record data in or to reproduce data from any selected one of the recording tracks on the surface of disc 1, a transducer head 2 must be moved over and in alinement with the selected track, and then dropped into closely spaced relation with the surface of the disc. After the head is correctly dropped it is supported at the desired small distance above the disc surface by a stream of air expelled through orifices in the head.

Between recording and reproducing operations head 2 is moved at a "home" position outside of the periphery of the disc 1. During movement of the head, and in particular while the head is being moved from the "home" position to the outermost recording track on the disc, the head must be raised substantially above the surface of disc 1 to prevent accidental contact between the head and the disc. Such contact will damage the head or the disc, or both. It is evident that the air stream would be ineffective to support the head between "home" position and the edge of the disc. Usually the air stream is not turned on until just before the head is dropped.

The servo system heretofore used for positioning the head 2 in alinement with any selected recording track on disc 1 includes a potentiometer 3 connected across a floating voltage supply 4. Potentiometer 3 has a movable contact or wiper 5 that is mechanically coupled or ganged to the supporting arm of head 2 so that wiper 5 is moved along the length of the potentiometer in synchronism with the inward and outward movement of head 2 relative to rotating disc 1. When head 2 is in its "home" position outside of the periphery of disc 1, wiper 5 is near the bottom of potentiometer 3. Accordingly a point near the bottom of potentiometer 3 can be referred to as the "home" position of wiper 5. When head 2 is alined with the innermost recording track on disc 1, wiper 5 is near the top of potentiometer 3. There is a position of wiper 5 corresponding to every position of head 2. Specifically, there is a "home" position of wiper 5 that corresponds to the "home" position of head 2, and there are one hundred successive positions of wiper 5 along the length of potentiometer 3 that respectively correspond with the one hundred positions of head 2 in which it is alined with respective ones of the one hundred recording tracks on the surface of disc 1. For convenience of identification, the one hundred tracks on the disc are referred to by one hundred different numbers, beginning with "00" for the outermost track and proceeding in order to "99" for the innermost track. The corresponding positions of wiper 5 can conveniently be referred to by the same numbers "00" to "99."

Potentiometer 3 is provided with a fixed tap at each of the one hundred wiper positions corresponding to the one hundred recording tracks. For simplicity and clarity, only twelve of these fixed taps are shown in the drawing. The twelve taps shown are identified by the reference numerals 00 through 09, and 98 and 99, according to the numbers of the recording tracks to which they correspond. For selecting any desired recording track, a movable contact 6 is connected to circuit ground or its equivalent and arranged so that it can be moved into contact with any one of the fixed taps 01 through 99 of potentiometer 3. Whenever head 2 is in alinement with the selected recording track, wiper 5 and contact 6 are connected to the same point on potentiometer 3. Consequently, when head 2 is in precise alinement with the selected recording track, wiper 5 is at ground potential, and not otherwise. The same results can be obtained with the fixed taps and the movable contacts on separate potentiometers or resistance networks connected in parallel.

The potentiometer 3 coupled to the voltage supply 4 constitutes a variable potential device; and the contact 6 connected to ground constitutes a means for establishing a reference potential at a point thereon and a means for establishing a potential of predetermined polarity at a first point or fixed tap 00 thereon. The potential at wiper 5 is supplied to a null detector 7 and a conventional positioning servo 8 for automatically moving head 2 and wiper 5 in the appropriate direction to bring the potential of wiper 5 substantially to ground potential. In this way head 2 is automatically positioned in alinement with any recording track that may be selected by adjustment of movable contact 6. In the servo system used prior to the present invention, as soon as the potential of wiper 5 became substantially equal to ground potential, indicating that the positioning operation was complete, null detector 7 supplied an electric signal to head-dropping circuit 9, which thereupon turned on the air stream and lowered the transducer head into closely-spaced relation with the surface of disc 1. Since this prior servo system is already known to those skilled in the art, it is believed that no further description thereof is necessary.

As long as there was no malfunctioning of the equipment, the servo system used prior to the present invention was quite satisfactory. However, malfunctioning due to the failure of circuit components would sometimes cause a false null, and the dropping of the transducer head, while wiper 5 and transducer head 2 were between the "home" position and the "00" position corresponding to the outermost or "00" recording track. In other words, the head might be dropped while it was still between the "home" position and the periphery of disc 1, and might then move into contact with the edge of disc 1. Such malfunctioning could seriously damage the equipment. The present invention solves this difficulty, and makes it virtually impossible for the head to drop between the "home" position and the "00" position. Furthermore, this is done without the use of mechanical switches or any other moving parts that are subject to wear and therefore likely to fail.

Whenever transducer head 2 is outside of the periphery of disc 1, where inadvertent dropping of the head could damage the equipment, potentiometer wiper 5 is between the "home" position and the "00" position. Under such circumstances, it is evident that the electric potential of wiper 5 will have a predetermined polarity relative to the electric potential at the "00" fixed tap. Whether this polarity is positive or negative depends upon the polarity of floating voltage supply 4. In the illustrated embodiment, the potential of wiper 5 is always negative with respect to the potential of the "00" fixed tap whenever transducer head 2 is between the "home" position and the "00" or outermost recording track. Therefore, the difficulties encountered in the prior equipment can be eliminated if dropping of the head is prevented, at any time that the potential of wiper 5 is negative relative to the potential of the "00" fixed tap. This is accomplished as follows:

Wiper 5 and the "00" fixed tap of potentiometer 3 are connected through resistors 10 and 11 to the two inputs of a differential amplifier 12, which compares the relative values of the two potentials and transmits a signal through lead 13 only when the potential at wiper 5 is positive with respect to the potential of the "00" fixed tap.

The differential amplifier 12 constitutes a potential comparing means. Since the differential amplifier may include separate gain controls for the two input voltages to be compared, it is not necessary that the voltage appearing at the potential probe or wiper contact 5 be actually less negative than the voltage of the first point or tap 00 to provide a signal to permit dropping of the transducer head. By appropriate adjustments of the amplifier 12, a predetermined proportion may be set up between the input voltages to permit dropping of the head on the 00 track or even slightly before the 00 track but safely upon the magnetic surface. The null detector 7 transmits a head-dropping signal through lead 14 only when the potential of wiper 5 is substantially equal to ground potential. An "and" or coincidence circuit 15, which may be any of the well-known "and" circuits that are familiar to those skilled in the computer art, transmits a head-dropping signal to the head-dropping circuit 9 only when signals are received simultaneously through both of the leads 13 and 14. Consequently, inadvertent dropping of head 2 between the "home" position and the "00" position is virtually impossible.

It should be understood that this invention in its broader aspects is not limited to the specific embodiment herein illustrated and described, and that the following claims are intended to cover all changes and modifications that do not depart from the true spirit and scope of the invention.

What is claimed is:

1. Magnetic recording and reproducing apparatus adapted to store magnetically recorded data in a plurality of side-by-side recording tracks, comprising a transducer, means for moving said transducer selectively between a "home" position and a plurality of positions alined with respective ones of said tracks, potentiometer means having a movable contact and a plurality of fixed taps, voltage supply means connected to said potentiometer means, means for moving said movable contact in sychronism with movement of said transducer so that each position of said movable contact on the potentiometer means corresponds to a definite position of said transducer relative to said recording tracks, said fixed taps of the potentiometer means being at positions electrically equivalent to the positions of the movable contact that corresponds to alinement of said transducer with respective ones of said recording tracks, electrical switching means operable to make contact with each of said fixed taps selectively, servo means responsive to a difference in electric potential between said movable contact and said switching means for automatically positioning said transducer in alinement with any selected one of said tracks, means for dropping said transducer into closely spaced relation with said selected recording track when said difference in electric potential is substantially zero, and means responsive to the relative potentials of said movable contact and the fixed contact on said potentiometer means that corresponds to the recording track nearest said "home" position for preventing the inadvertent dropping of said transducer between said "home" position and said nearest track.

2. Magnetic recording and reproducing apparatus comprising a rotative disc having a magnetic recording surface adapted to store magnetically recorded data in a plurality of concentric circular recording tracks, a transducer, means for moving said transducer laterally with respect to said surface between a "home" position and a plurality of positions alined with respective ones of said recording tracks, selectively, said "home" position being outside of the periphery of said disc, floating voltage supply means, potentiometer means connected across said voltage supply means, said potentiometer means having a movable contact and a plurality of fixed taps, means for moving said movable contact along the length of said potentiometer means in sychronism with movement of said transducer laterally with respect to said disc so that each position of said movable contact on the potentiometer means corresponds to a definite lateral position of said transducer relative to said recording surface, said fixed taps of the potentiometer means being at positions electrically equivalent to the positions of said movable contact that corresponds to alinement of said transducer with respective ones of said recording tracks, a reference-potential circuit junction, electrical switching means operable to connect each of said fixed taps selectively to said reference-potential junction, servo means responsive to the electric potential of said movable contact for automatically moving said transducer and said movable contact in the appropriate direction for the electric potential for said movable contact ot approach said reference potential, whereby said transducer is automatically moved into alinement with any selected one of said recording tracks under the control of an electrical switching means, means for dropping said transducer into closely spaced relation with said recording surface only when the electric potential of said movable contact is substantially equal to said reference potential, and means responsive to the relative electric potentials of said movable contact and the fixed contact on said potentiometer that corresponds to the outermost one of said recording tracks for preventing the inadvertent dropping of said transducer between said "home" position and said outermost track.

3. Magnetic recording and reproducing apparatus comprising a rotative disc having a magnetic recording surface adapted to store magnetically recorded data in a plurality of concentric recording tracks, a transducer, means for moving said transducer laterally with respect to said surface between a "home" position and a plurality of positions alined with respective ones of said tracks, selectively, said "home" position being outside of the periphery of said disc. floating voltage supply means, a potentiometer connected across said voltage supply means, said potentiometer having a movable contact and a plurality of fixed contacts, means for moving said movable contact along the length of said potentiometer in synchronism with movement of said transducer laterally with respect to said recording surface so that each position of said movable contact on the potentiometer corresponds to a definite lateral position of said transducer relative to said recording surface, said fixed taps of the potentiometer being at positions of the movable contact that correspond to alinement of said transducer with respective ones of said recording tracks, electrical switching means operable to connect each of said fixed taps selectively to circuit ground, servo means responsive to the electric potential of said movable contact for automatically moving said transducer and movable contact toward a null position at which the movable contact is substantially at ground potential, a differential amplifier connected for comparing the electric potential of said movable contact with the electric potential of the fixed tap on said potentiometer that represents the position of the outernmost one of said recording tracks, and means for dropping said transducer into closely-spaced relation with said recording surface only when the voltages compared by said differential amplifier have predetermined relative polarities and said movable contact is substantially at ground potential, whereby inadvertent dropping of said head between said "home" position and the position in alinement with the outermost one of said recording tracks is prevented.

References Cited in the file of this patent

UNITED STATES PATENTS

| | | |
|---|---|---|
| 2,750,553 | Anderson | June 12, 1956 |
| 2,751,274 | Andrews | June 19, 1956 |